United States Patent
Lim

[11] Patent Number: 5,249,677
[45] Date of Patent: Oct. 5, 1993

[54] COMPACT DISC CASE

[76] Inventor: Jin-kyu Lim, Room 9 1503, Sampung Apartment, Sucho-dong, Sucho-ku, Seoul, Rep. of Korea

[21] Appl. No.: 922,151
[22] Filed: Jul. 30, 1992
[51] Int. Cl.$^5$ .............................................. B65D 85/57
[52] U.S. Cl. .................................... 206/310; 206/313; 220/345
[58] Field of Search ............... 206/313, 312, 310, 309, 206/307, 444; 220/345

[56] References Cited

U.S. PATENT DOCUMENTS

| | | | |
|---|---|---|---|
| 3,951,264 | 4/1976 | Heidecker et al. | 206/309 X |
| 4,655,344 | 4/1987 | Ackeret | 206/309 X |
| 4,702,369 | 10/1987 | Philosophe | 206/310 X |
| 4,899,875 | 2/1990 | Herr et al. | 206/313 |
| 5,011,010 | 4/1991 | Francis et al. | 206/313 X |
| 5,135,105 | 8/1992 | Schmeisser | 206/309 |

Primary Examiner—Steven N. Meyers
Assistant Examiner—Jacob K. Ackun, Jr.
Attorney, Agent, or Firm—Anthony J. Casella; Gerald E. Hespos

[57] ABSTRACT

This invention is related to a case for keeping compact discs, more specifically a case opened by a sliding method.

The compact disc case comprises a lower case with an inner case (30) having said fixing component (24), a projected arc wall (21) on the upper surface thereof, protuberances (31) on the sides thereof, and an angled portion (32) on the front portion thereof; and a bottom case (40) having a vertical wall formed so as to receive said inner case (30), holes (41) in which the protuberances of said case (30) is inserted, and rails (25) formed so as to be inserted into the rail grooves (11) of the upper case (10).

4 Claims, 6 Drawing Sheets

COMPACT DISC CASE

BACKGROUND OF THE INVENTION

This invention is related to a case for storing a compact disc, more specifically it is a case which is opened by a sliding method.

Up to now, some cases for keeping compact discs have been designed so that the compact disc is inserted into the case and then covered with a outside cover which is kept separately. However, this type of compact disc case is very inconvenient for opening the case.

Prior cases for compact discs have had transverse pivots paralleled to their edges so that the cases lift open vertically. When a compact disc was to be withdrawn from these cases the case must be oriented horizontally, therefore it is inconvenient to use. In addition, when the opening is forced it's possible to damage the compact disc.

SUMMARY OF THE INVENTION

This invention is provided to solve or mitigate the above problems. Embodiments of the invention will be now described by way of example and with reference to the accompanying drawings.

DESCRIPTION OF THE PREFERRED EMBODIMENT

Figure 1:
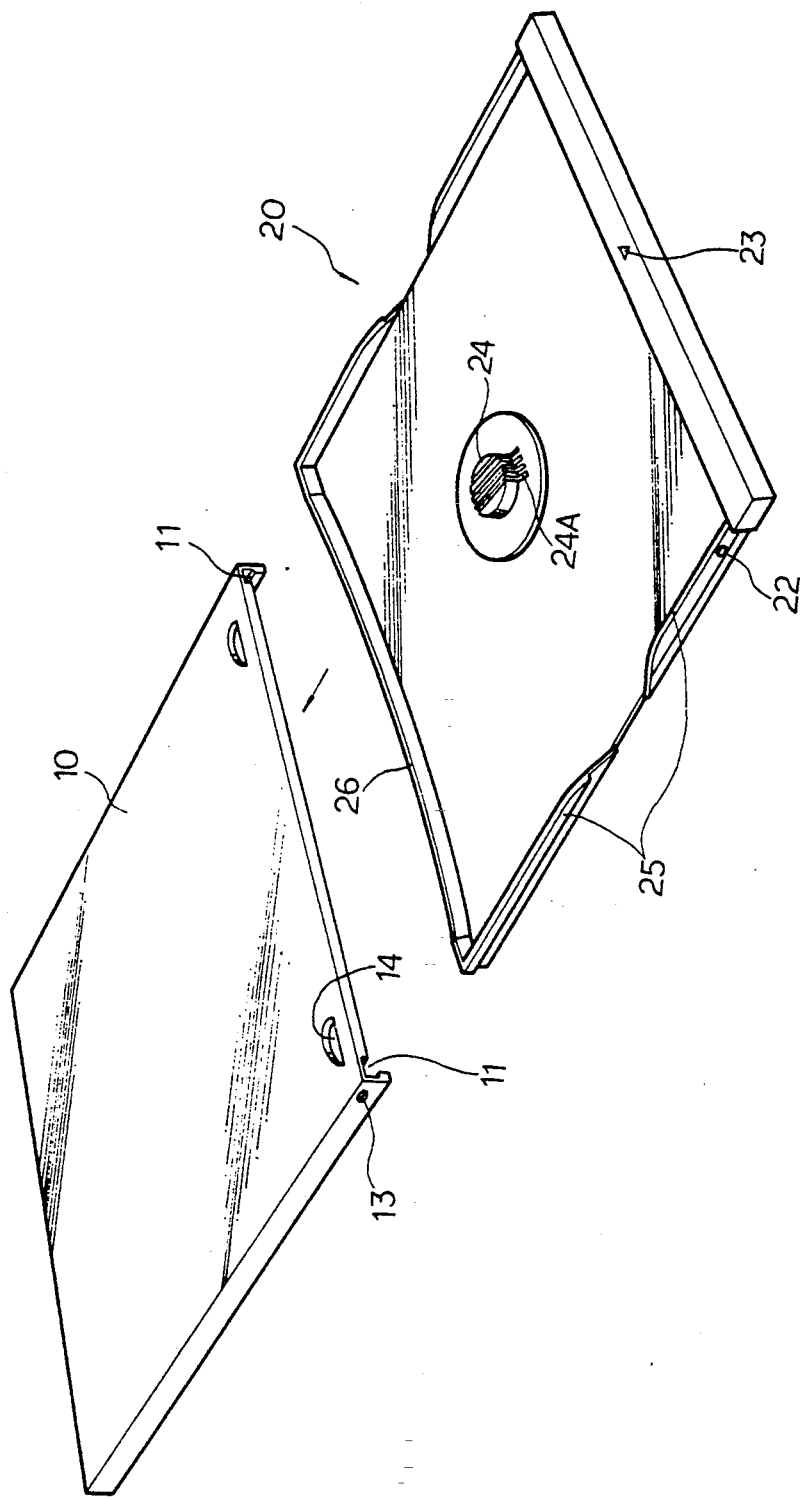
FIG. 1 is an exploded perspective view of the compact disc case.

In an embodiment of the compact disc case shown in FIG. 1, the compact disc case consists of an upper case (10) and a lower case (20). The lower case (20) has a pair of sliding rails (25) formed symmetrically on the side walls, a pair of protuberances (22) formed symmetrically just below the rail (25) and a triangular mark (23) on the front upper surface. The triangular mark (23) indicates the withdrawing direction of the lower case (20), from the upper case (10).

On the upper surface of the lower case (20) a fixing component (24) is attached. The fixing component (24) has narrow longitudinal openings (24A) at regular intervals.

Figure 2:
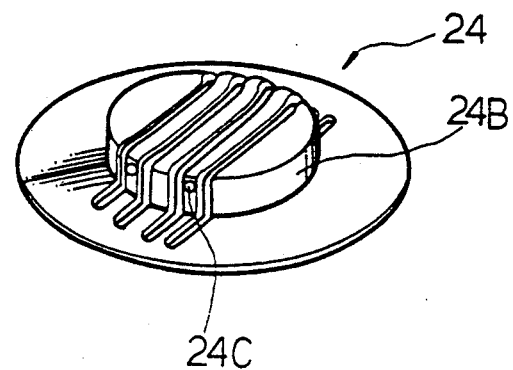
FIG. 2 is a perspective view of the fixing component depicted in FIG. 1.
Figure 3:
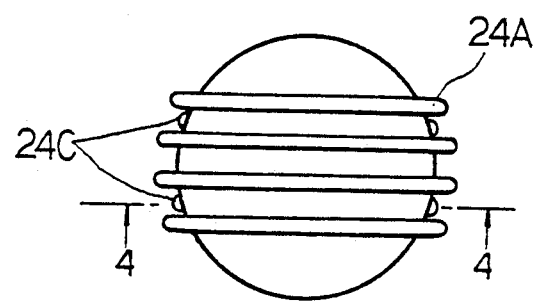
FIG. 3 is a top plan view of the fixing component shown in FIG. 2.
Figure 4:
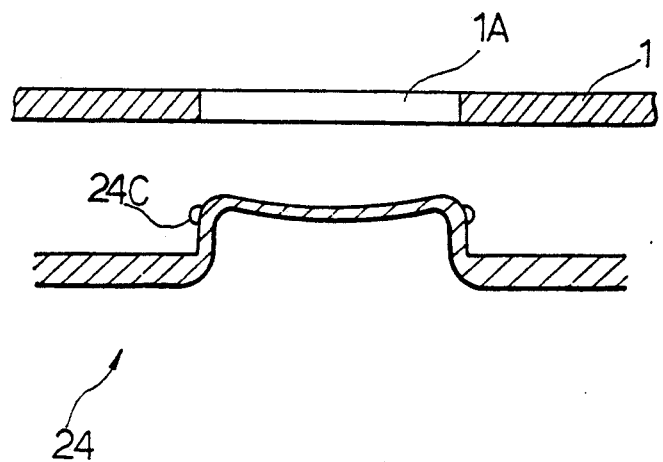
FIG. 4 is a cross-section taken along line 4—4 in FIG. 3 and showing a compact disc in exploded relationship to the fixing component.

FIGS. 2-4 show a detailed view of the fixing component (24). As shown in FIG. 4, the protruded upper surface of fixing component (24) is somewhat dented, and accordingly, the circumference of the protruded upper surface is somewhat projected. The narrow longitudinal openings (24A) are extended from the protruded upper surface to the bottom surface to which the fixing component (24) is attached. The side wall (24B) of the fixing component (24) has two pairs of protuberances (24C) between the longitudinal openings (24A).

When a compact disc (1) is inserted into the fixing component (24), the disc can be securely settled. The fixing component (24) also provides an elastic means which allows one to conveniently detach the compact disc. Consequently, by means of the openings (24A) the insertion of a compact disc (1) into the fixing component (24) and/or the detaching of a compact disc (1) from the fixing component (24) is easily accomplished and the firm placement of the compact disc is possible.

The upper case (10) in which the lower case (20) is inserted has rail grooves (11) so that the rails (25) of the lower case (20) are slid in or withdrawn.

Figure 5:
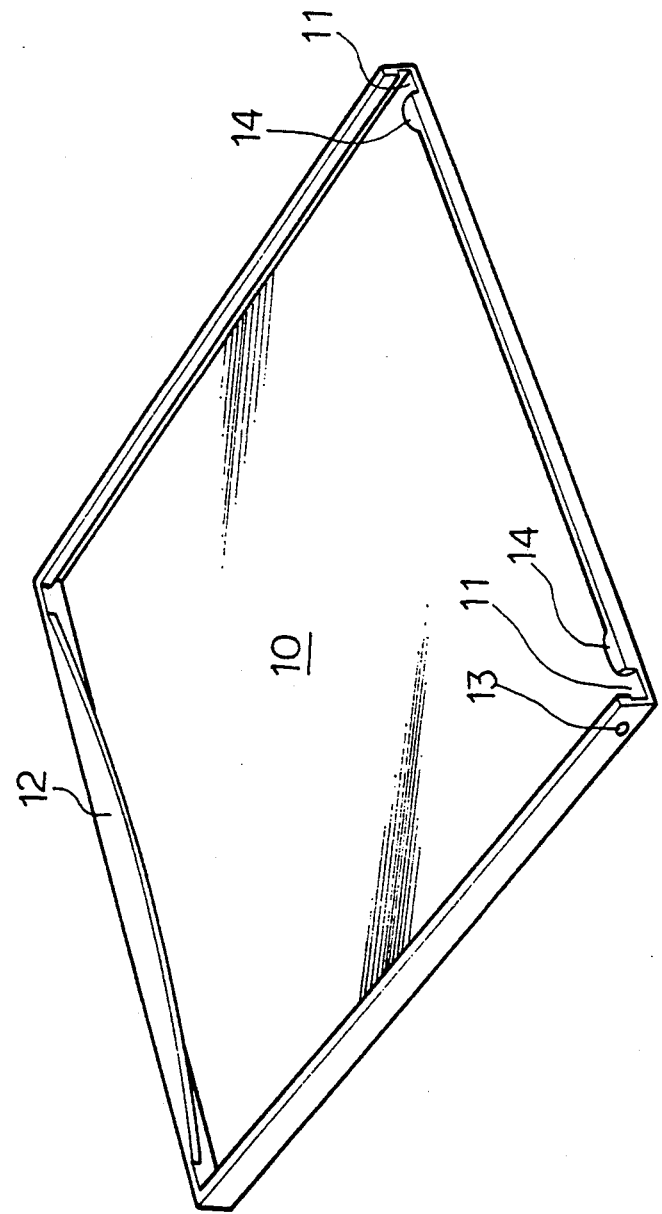
FIG. 5 is a bottom view of the upper case (10).

FIG. 5 is a bottom view of the upper case (10) shown in FIG. 1. A point of contact (12) is formed at the inner rear portion of the upper case (10), where it is connected with the inner rear portion of the lower case. There are a pair of grooves (13) near the rail grooves in inserting part of the outside wall of the upper case (10). There are a pair of protrusions (14) at the entrance portion into which the lower case (20) is inserted, so that, when the lower case (20) is slid out from the upper case (10), the lower case (20) is not easily detached from the upper case (10). That is, the rear part (26) of the lower case (20) is connected with the protrusions (14) of the upper case (10).

Figure 6:
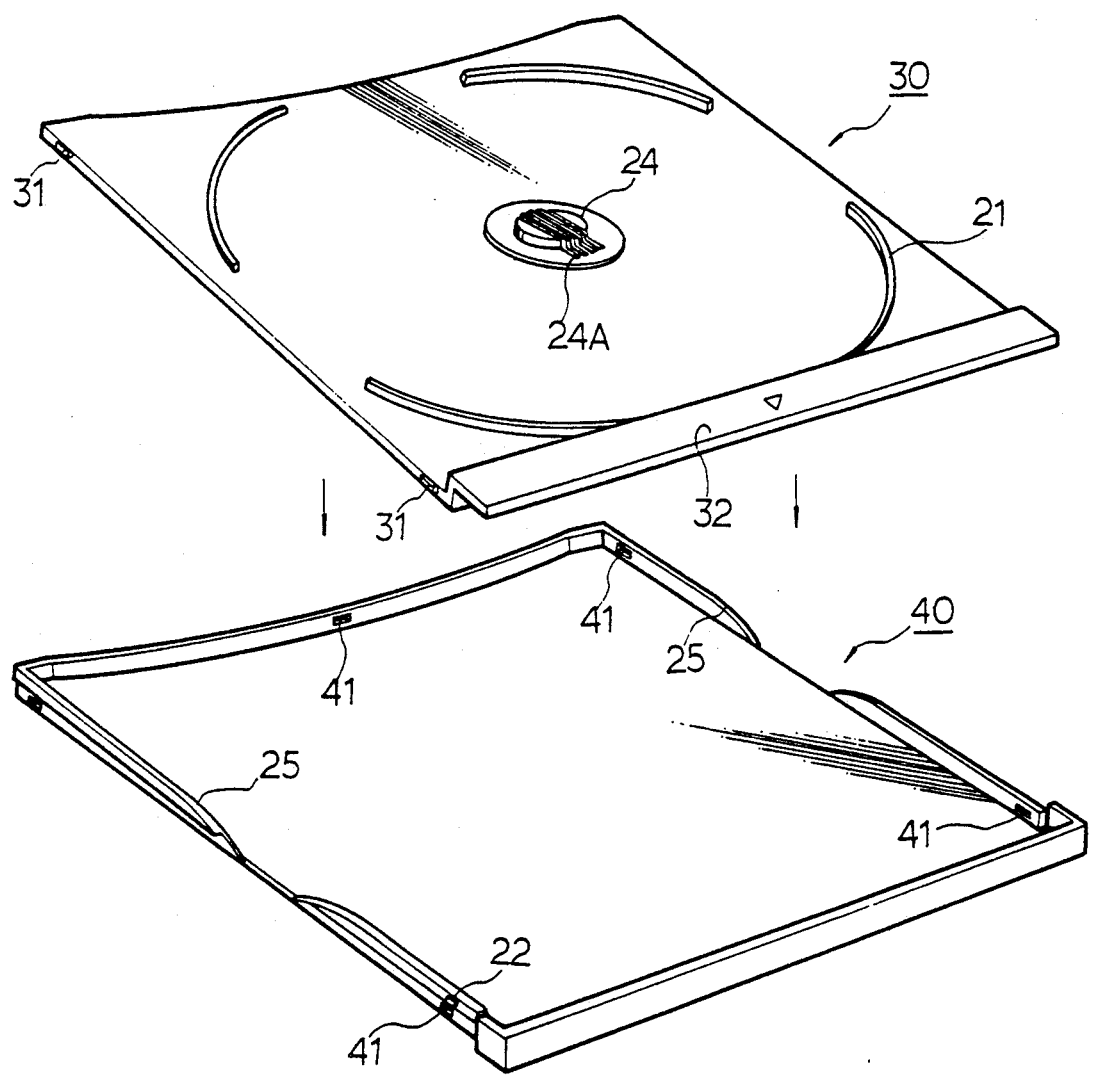
FIG. 6 is an exploded perspective view of another embodiment of the lower case.

FIG. 6 is another example of the lower case. As shown, the lower case is devided into two arts. Consequently, the lower case is constructed with an inner case (30) and a bottom case (40).

Figure 7:
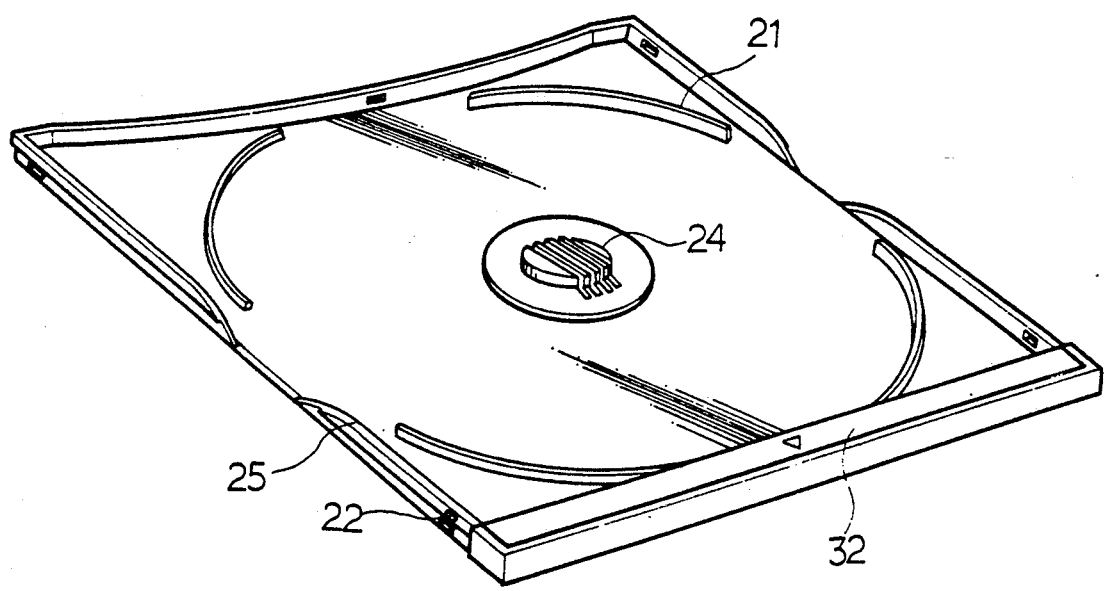
FIG. 7 is a perspective view of the lower case in FIG. 6 in an assembled condition.
Figure 8:
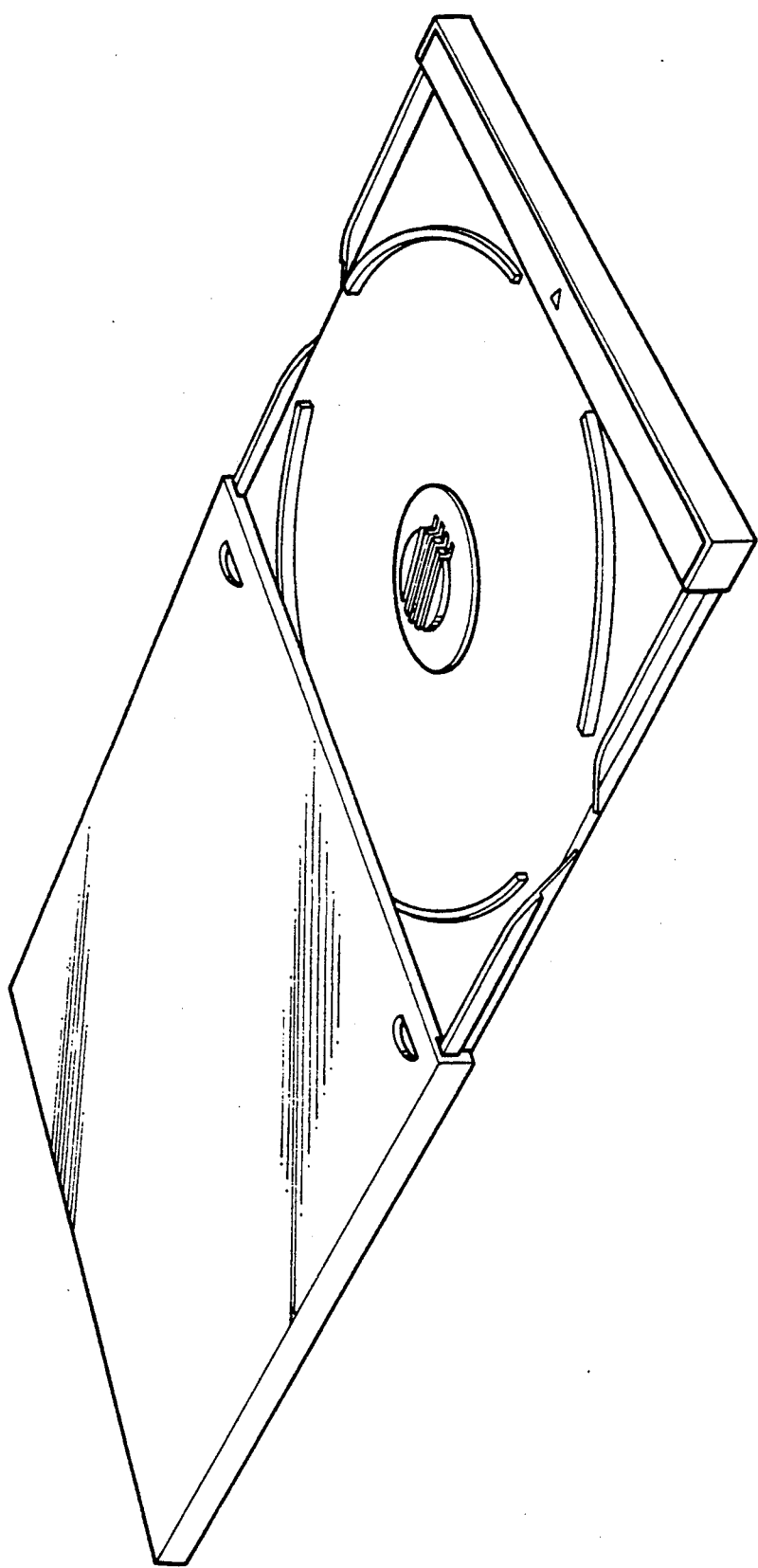
FIG. 8 is a perspective view of the lower case of FIG. 7 slidably inserted into an upper case.

FIG. 7 is an assembly view of FIG. 6 and FIG. 8 is an opened view of the lower case.

The inner case (30) has a fixing component (24), a projected arc wall (21), a four protuberances (31) at the side, and an angle portion (32) at the front. The bottom case (40) has a bottom surface and a low side wall so that the flat inner case (30) can be received. The bottom case (40) has a pair of rails (25) and four holes (41) under the rails (25). The holes (41) coincide with the protuberances (31) of the inner case (30).

As shown in FIG. 1, the compact disc is placed at the fixing component (24) of the lower case (20) and then the lower case (20) is slid into the upper case (10). Obversely, when the compact disc is withdrawn for use, the lower case (20) is withdrawn from the upper case (10) along the rail grooves (11).

Another embodiment of the present invention of FIG. 6 to FIG. 8, also shows the same opening operation as the above description.

However, in this embodiment, the inner case (30) allows a compact disc case to be constructed more rigidly, therefore providing more security to the compact disc.

In accordance with the present invention it is easy to open and protect the compact disc. Having described specific features of the present invention with reference to the accompanying drawings, it is to be understood that this invention is not limited to those precise embodiments, and that various changes and modifications may be effected thereto without departing from the scope or the spirit of the invention as defined in the appended claims.

What is claimed is:

1. A compact disc case comprising:
   a generally rectangular upper case having a substantially planar top wall, a rear wall extending downwardly from said top wall, a pair of parallel side walls extending downwardly from said top wall and connected to said rear wall, each said side wall including a rail groove, said top wall further comprising a pair of downwardly directing protrusions on projections thereof remote from said rear wall and in proximity to the respective side walls;

a lower case having a substantially planar bottom wall, a pair of opposed parallel side walls extending upwardly from said bottom wall, said side walls of said lower case each having elongated rails projecting outwardly therefrom and slidably engaged in the respective rail grooves of said upper case, such that said lower case is slidable in a plane relative to said upper case with the respective top and bottom walls of said upper and lower cases being substantially parallel, said lower case further comprising a rear wall projecting upwardly from said bottom wall and connecting said side walls, said rear wall of said lower case being disposed intermediate said rear wall of said upper case and said protrusions of said upper case, such that said protrusions of said upper case engage said rear wall of said lower case to prevent complete slidable separation of said upper and lower cases; and a fixing component disposed substantially centrally on said bottom wall of said lower case and projecting upwardly therefrom toward said top wall of said upper case, said fixing component including a substantially cylindrical side wall and a concave top wall, a plurality of substantially parallel slits extending across the concave top wall and said cylindrical side wall, such that sectors of said fixing component defined by said parallel slits are elastically deformable for retaining a compact disc thereon, at least selected sectors of said cylindrical side wall of said fixing component including protuberances for detachably holding a compact disc on said fixing component.

2. A compact disc case as in claim 1, wherein said fixing component further comprises a planar base extending outwardly from the generally cylindrical side wall thereof, said parallel slits extending into portions of said base adjacent said cylindrical side wall, said base being securely affixed to the bottom wall of said lower case.

3. A compact disc case comprising:
a generally rectangular upper case having a substantially planar top wall, a rear wall extending downwardly from said top wall, a pair of parallel side walls extending downwardly from said top wall and connected to said rear wall, each said side wall including a rail groove, said top wall further comprising a pair of downwardly directing protrusions on portions thereof remote from said rear wall and in proximity to the respective side walls;

a lower case having a substantially planar bottom wall, a pair of opposed parallel side walls extending upwardly from said bottom wall, said side walls of said lower case each having elongated rails projecting outwardly therefrom and slidably engaged in the respective rail grooves of said upper case, such that said lower case is slidable in a plane relative to said upper case with the respective top and bottom walls of said upper and lower cases being substantially parallel, said lower case further comprising a rear wall projecting upwardly from said bottom wall and connecting said side walls, said rear wall of said lower case being disposed intermediate said rear wall of said upper case and said protrusions of said upper case, such that said protrusions of said upper case engage said rear wall of said lower case to prevent complete slidable separation of said upper and lower cases;

an inner case comprising a flat plate secured adjacent the bottom wall of said lower case intermediate the side walls and the rear wall thereof, said flat plate including an arc wall projecting upwardly therefrom and toward the upper case, said arc wall comprising a plurality of arc segments of a circle dimensioned to receive the compact disc therein, said inner case further comprising a front wall angularly offset to extend beyond the lower case to define a grip for slidably moving said lower case relative to said upper case; and a fixing component disposed substantially centrally on said flat plate of said inner case and projecting upwardly therefrom toward said top wall of said upper case, said fixing component including a substantially cylindrical side wall and a concave top wall, a plurality of substantially parallel slits extending across the concave top wall and said cylindrical side wall, such that sectors of said fixing component defined by said parallel slits are elastically deformable for retaining a compact disc thereon, at least selected sectors of said cylindrical side wall of said fixing component including protuberances for detachably holding a compact disc thereon.

4. A compact disc case as in claim 3, wherein said fixing component further comprises a planar base extending outwardly from the generally cylindrical side wall thereof, said parallel slits extending into portions of said base adjacent said cylindrical side wall, said base being securely affixed to the flat plate of said inner case.

* * * * *